(No Model.)
W. H. CURTIS.
TICKET PRINTING MACHINE.
No. 380,278. Patented Mar. 27, 1888.
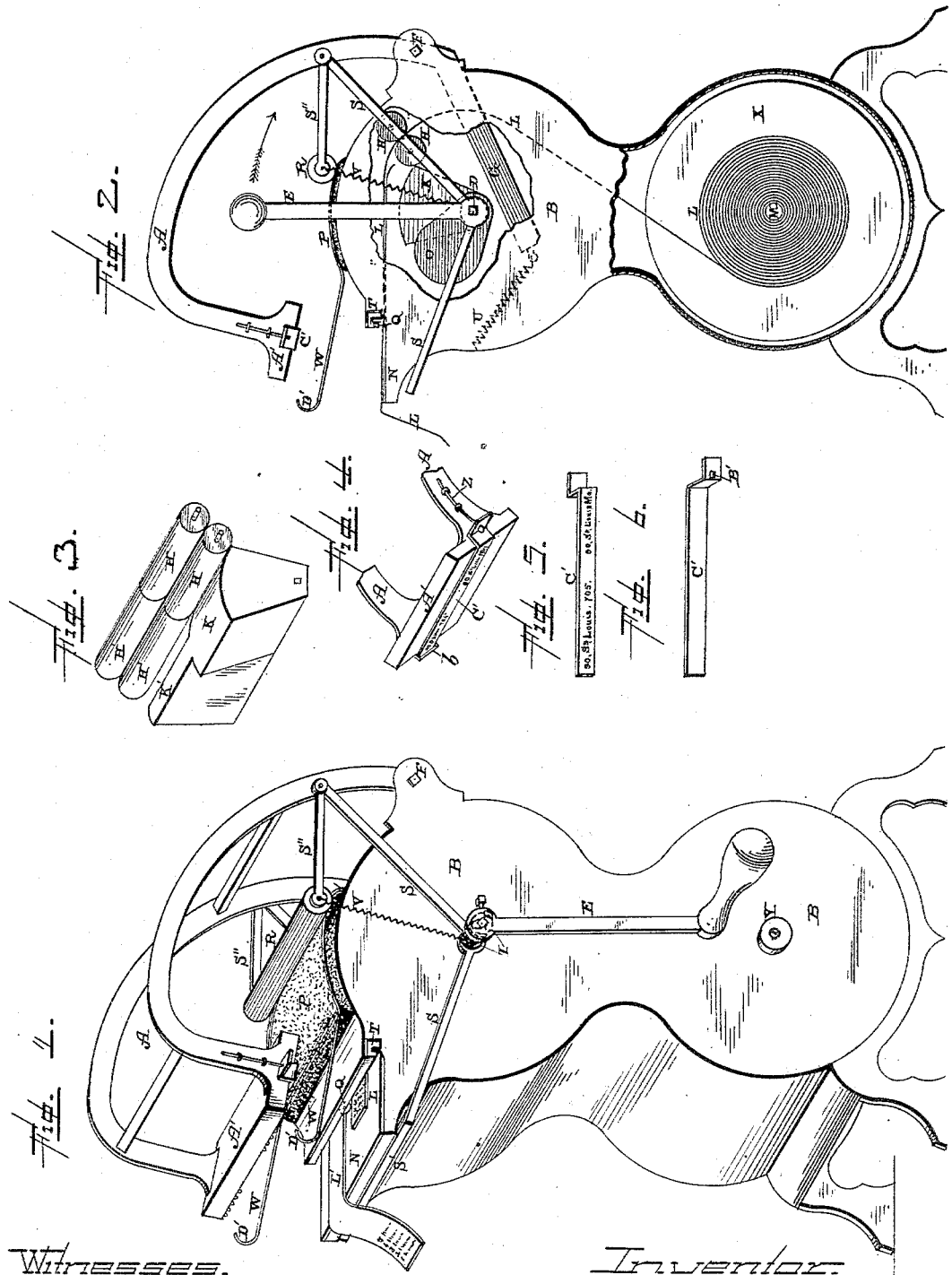

UNITED STATES PATENT OFFICE.

WILLIAM H. CURTIS, OF LA DUE, MISSOURI.

TICKET-PRINTING MACHINE.

SPECIFICATION forming part of Letters Patent No. 380,278, dated March 27, 1888.

Application filed September 9, 1887. Serial No. 249,244. (No model.)

*To all whom it may concern:*

Be it known that I, WILLIAM H. CURTIS, of La Due, in the county of Henry and State of Missouri, have invented certain new and useful Improvements in Ticket-Printing Machines; and I do hereby declare the following to be a full, clear, and exact description of the invention, such as will enable others skilled in the art to which it pertains to make and use it, reference being had to the accompanying drawings, which form part of this specification.

My invention relates to an improvement in ticket-printing machines which are intended for the use of railroad, steamboat, and other agents; and it consists in the combination of devices which will be more fully described hereinafter, and pointed out in the claims.

The object of my invention is to do away with the necessity of railroad and other agents keeping a large number of tickets on hand, as is now the case, by providing each agent with a machine whereby railroad and other tickets may be produced from blanks just as needed, and to simplify the method and labor of getting up reports of the tickets sold by producing at the same time the ticket is issued a stub or register upon a separate piece of paper, which stubs or registers can be torn off at any time and forwarded to headquarters, and to prevent agents from getting out of tickets, as is now frequently the case.

Figure 1 is a perspective of a machine embodying my invention. Fig. 2 is a side elevation, the casing being broken away. Fig. 3 is a detail perspective of the rollers H H' and the cam for operating them. Fig. 4 is a detail perspective of the die-frame. Figs. 5 and 6 are detail views of the dies.

The mechanism hereinafter described is placed in and supported upon a suitably-shaped frame-work, B, which is made of any material desired. I preferably form the frame approximately 8-shaped in side elevation, in the bottom half of which is placed a coil of paper, L, supported upon a spindle, M, which has its outer ends to rest in suitable bearings or openings formed in the side of the frame and its inner ends screwed into the partition plate or disk X, that divides the lower portion of the frame into two compartments, placed upon the spindle or shaft M. Upon the opposite side of the disk X from the paper L is another coil of paper, L', Fig. 1, the purpose of which will be more fully described hereinafter.

Pivoted to the ears F, formed upon the upper portion of the frame upon opposite sides thereof, is the stamping-frame A, which extends forward over the top of the frame and made approximately semicircular in shape, and having the horizontal portion A', to which the die or stamp is fastened. Formed integral with or rigidly secured to the frame A just below its pivotal point in the ears F are the arms G, which extend downward and forward, and by means of which the frame A is operated.

Extending horizontally through the upper portion of the frame B is the operating-shaft D, to one end of which are attached the handle E and the operating-cams K O. Loosely placed upon opposite sides of the shaft D are the arms G, which diverge therefrom slightly upward, and are connected at their outer ends by the horizontal portion S', extending across the front of the machine, and by means of which the levers are operated. Pivoted to the rear ends of these levers S are the forwardly-extending arms S'', in the forward ends of which is journaled the inking-roller R. A downward pressure upon the handle S' will cause the inking-roller to move forward over the pad P (made upon the upper surface of the frame and conforming to its shape) and gather ink therefrom, and to move forward under the stamp upon the plate A', and is held in contact therewith by the two springs W, attached to opposite sides of the pad or frame B, and extending forward a suitable distance beyond the plate A, and curved upward at D' to form a stop for the roller R. A spiral spring, I, is placed upon the shaft D between the head of the handle E and the levers S, which keeps them constantly pressed against the outside of the case B, thereby causing sufficient friction to hold the levers in their normal position. The inking-roller R is held in contact with the pad P by means of the springs V as it is moved back and forth over it by the handle S' for the purpose of inking the die placed upon the plate A'.

Journaled in the upper portion of the frame or case B are the rollers H H and H' H', which together extend entirely across the frame B, and by means of which the paper strips L L' are forced outward into position to be stamped. These rollers H H and H'H' are loosely placed upon a shaft, and the two pairs revolve independently of each other.

Sliding in the forward end of the upper portion of the frame B is the slide T, which carries a rotary cutter, Q, for severing the tickets. This rotary cutter is placed just in rear of the supporting-plate N, upon which the paper rests when forced outward to be stamped, and in close proximity thereto, the back edge of the plate N being sharpened, which, in connection with the rotary cutter Q, makes a smooth cut. The slide T moves back and forth in suitable grooves made in the top of the frame, and is made of such a shape as to allow the paper being printed upon to pass under it and out over the plate N in position to receive the stamps.

By placing the cutter back of the holding-plate N, upon which the impression is made, no movement of the strips of paper is necessary subsequent to printing thereon and before cutting, as would be the case if the cutter were placed at the front edge of the holding-plate, so as to bring the ticket which it is desired to sever outside of the cutter.

The two pairs of rollers H and H' are caused to revolve by frictional contact of the cam K upon the shaft D when the shaft is revolved by the handle E. Passing between the rollers H is the strip L, upon which the tickets are printed, and between the rollers H' the strip upon which the stub or register is printed passes. As the tickets are of greater length than the stubs, it is necessary that the rollers H should have a greater revolution at each operation of the handle E than the rollers H'. This is accomplished by means of the reduced portion K' of the cam K. By means of this construction the revolution of the two pairs of rollers will be regulated according to the shape of the cam K, to suit any size ticket or stub, by the relative length of the two circumferences or arcs of the cam K, as shown in Fig. 4.

The stamping-frame A is operated by means of the cams O upon opposite ends of the shaft D, which operate upon the arms G as the shaft D is made to revolve, and cause the forward end of the frame to be depressed upon the plate N or paper which extends over it, the frame being returned to position by means of the springs U upon opposite sides of the frame, which have one end connected to the arms G and their opposite ends to the frame.

As shown in Figs. 5 and 6, the dies or stamps C' are composed of sheet metal, preferably steel, and have upon one end numbers and words for the stubs and upon the opposite end words, numbers, &c., for the tickets. One end of the die is bent, as shown, and provided with the slot B'. The plain end of the die is inserted into a loop, b, or slot formed in one end of the plate A', and its opposite end is held in position by the spring-catch Z, which catches in the slot B', formed in the bent end of the die. This construction enables the die to be readily and quickly removed and another put in its place. Each agent is provided with dies giving the name of the station the ticket is issued at and the name of the place it is issued to, and these will be arranged in a suitable case for convenient access. The dies will also have upon their face the cost, and the operator informs himself at a glance of the value of the ticket.

The strip from which the tickets are made has printed in regular order upon it special remarks, consecutively numbered, and a space left in the proper place for the name of the station issuing the ticket and the name of the station to which it is issued, as before described.

There will be made in the backs of the lower portion of the frame B a door, by means of which access may be had to the rolls of paper and the same placed in position therein, removed therefrom, or adjusted, as necessity may require. One end of the shaft or spindle M is secured by means of the button Y, which allows the ready removal of the spindle and attachments.

The operation of my invention is as follows: When it is desired to issue one or more tickets to a certain station, the proper die or stamp is placed in position upon the plate A' of the frame A. The inking-roller is passed over the pad P and evenly pressed against the die by means of the springs W by a pressure upon the handle S' of the levers S. The shaft D is then caused to revolve by means of the crank or handle E, carrying with it the operating-cams O K. Cam K first operates upon the two pairs of rollers H H', between which the two strips of paper L and L' pass, and revolves them, drawing the two strips of paper upward from the spindle M and projecting them over the plate N in position to be stamped. The continued revolution of the shaft causes the cams O to strike the arms G of the frame A, which forces the forward end of the frame A downward upon the paper which has been projected over the plate N, as before described, and makes two impressions, one upon each strip of paper. By reason of the shape of the cam K one pair of rollers is made to revolve farther than the other and to project the two strips of paper accordingly. The two arcs of the cam K are made of the same length as the ticket and stub themselves, and hence when the strips are started right they continue to be projected the proper distance to receive the stamp at each operation of the handle E. After stamping the ticket it is severed by the slide T, carrying rotary cutter Q.

By the use of a machine of the above description the expense occasioned by a great outlay of tickets is obviated. The mechanism is so arranged as to cause corresponding numbers to be fed forward for the printing of stubs at the same time the tickets are printed, which enables the operator at the close of the day to sever the projecting registers or stubs, add up the value of the fares stamped thereon, and remit with the stubs (thus making them a report) the amount equal to the total of said value, which total must correspond with the receipts. It is not possible to get out of tickets, as is now frequently the case. The large amount of time required for counting up tickets on hand in order to report the number sold is rendered unnecessary, as the stubs give a full report. In consequence of the consecutive numbers tickets cannot be sold out of order or dated ahead, and through collusion between conductor and agent the company be defrauded. It prevents clerks at the general office from misappropriating tickets to their own use, and by simplifying the system materially reduces the work of the general office in keeping the ticket-agents' accounts, requiring less employés to do the work.

Having thus described my invention, I claim—

1. The combination of a suitable case or frame adapted to carry a roll of paper to be formed into tickets, a printing-frame pivoted to the upper portion of said frame, having a stamp or die attached to its upper forward end and its opposite end provided with operating-arms, rollers journaled in the frame, between which the paper to be printed is passed, and a shaft passing through the upper portion of the frame, having two cams, one for operating the printing-frame and the other for projecting the paper to be printed upon, substantially as described.

2. The combination of the case or frame, a spindle placed in the frame carrying two rolls of paper to be printed into tickets and stubs, a printing-frame pivoted to the upper portion of the frame, carrying a die or stamp in its upper forward end and its opposite end formed into operating-arms, two pairs of rollers journaled in the frame, between which pass the two strips of paper, and a shaft journaled in the upper portion of the frame, having two cams, O K, for operating the printing-frame, the cam K having two arcs of unequal length, for the purpose described.

3. The combination of the frame B, printing-frame A, shaft D, carrying mechanism, substantially as described, for operating frame A, rollers H H', a mechanism, substantially as described, for operating them and projecting the paper to be printed upon, the levers S, loosely journaled upon the shaft D, the arms S'', carrying inking-roller R, pad P, and springs W, substantially as set forth.

4. The combination of the frames A B, rollers H H', for projecting the paper being printed upon, a mechanism for operating frame A and rollers H H', levers S, arms S'', roller R, pad P, springs W, having the outer ends bent upward, so as to form a stop for the roller R, and spring V, for keeping the roller in contact with the pad, substantially as specified.

5. In a machine for printing upon a strip of paper, the combination of the main frame having a recess formed therein at the rear of the supporting-plate, the supporting-plate upon which the ticket-strip to be printed rests, and an endwise-moving slide carrying a rotary cutter placed in the said recess, whereby the ticket to be severed is in front of the cutter when printed, for the purpose substantially as described.

6. The combination of the frame B, frame A, having plate A', arms G, and spring U, for returning them to position, shaft D, cams O K, rollers H H', levers S, and spring I, for pressing them against the outside of the main frame, arms S'', roller R, pad P, springs W, and plate N, substantially as shown and described.

7. In a machine for printing tickets and stubs upon strips of paper, the combination, with the main frame carrying a stamping-frame having operating-arms and the rollers for operating the two strips of paper, of a shaft passing through the main frame and provided with cams for operating alternately upon the rollers and operating-arms of the printing-frame, for the purpose described.

8. The combination, with the plate A', having the stationary loop b and a vertical spring-catch, Z, secured to the outside of the frame A, of the die C', having a straight portion for engaging the loop and its opposite end L-shaped, the vertical portion of which rests against the outer side of the plate A', and its horizontal portion having a slot, with which the catch engages, substantially as shown.

In testimony whereof I affix my signature in presence of two witnesses.

WM. H. CURTIS.

Witnesses:
   GEO. S. HOLLIDAY,
   C. H. SNYDER.